No. 896,300. PATENTED AUG. 18, 1908.
C. DE W. JARVIS.
ELECTRICAL TESTING INSTRUMENT.
APPLICATION FILED JUNE 19, 1907.
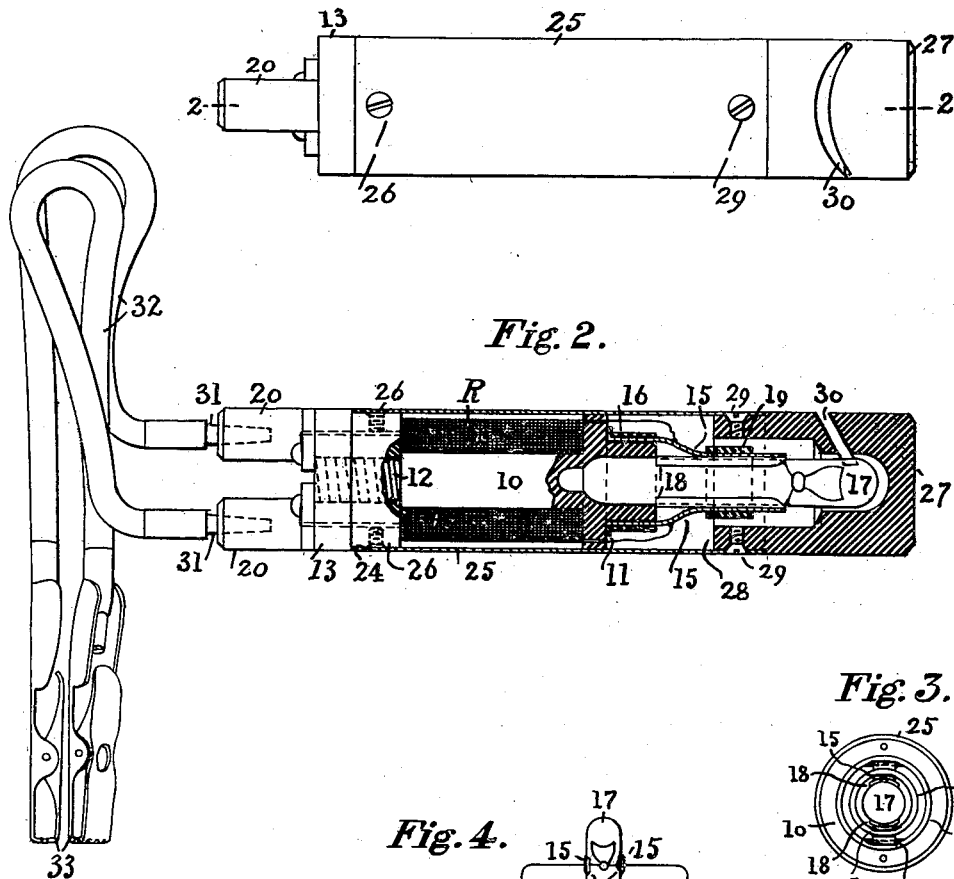
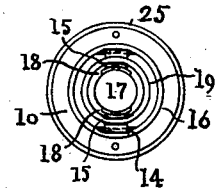
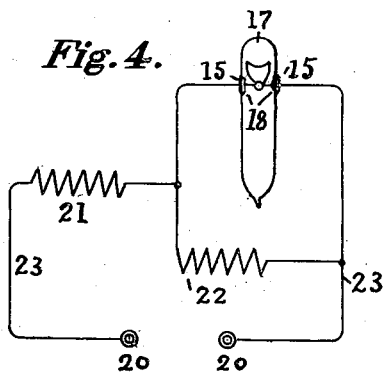
Attest.
Frank C. Lockwood.
Joseph A. Gately
Inventor.
Cameron De Witt Jarvis
by Thomas D. Lockwood
Attorney.

UNITED STATES PATENT OFFICE.

CAMERON DE WITT JARVIS, OF WINTHROP, MASSACHUSETTS, ASSIGNOR TO AMERICAN TELEPHONE AND TELEGRAPH COMPANY, A CORPORATION OF NEW YORK.

ELECTRICAL TESTING INSTRUMENT.

No. 896,300.  Specification of Letters Patent.  Patented Aug. 18, 1908.

Application filed June 19, 1907. Serial No. 379,804.

*To all whom it may concern:*

Be it known that I, CAMERON DE W. JARVIS, residing at Winthrop, in the county of Suffolk and State of Massachusetts, have invented certain Improvements in Electrical Testing Instruments, of which the following is a specification.

This invention relates to electrical testing devices, and particularly to portable instruments adapted for the approximate determination of differences of potential. Its principal objects are to provide such a device which is so small and compact as to be suitable for carrying in the pocket, the indications of which may be readily observed, and which will not be liable to get out of order.

In the accompanying drawing, in which same characters are applied to like parts throughout the several views, Figure 1 is a side elevation of one embodiment of the invention; Fig. 2 is a longitudinal section on the line 2—2 of Fig. 1; Fig. 3 is an end elevation looking from the right in Fig. 1, but with the casing-cap removed, and Fig. 4 illustrates diagrammatically the circuit arrangement of the instrument.

The numeral 10 designates a body portion of generally cylindrical form, preferably of some such insulating material as hard rubber, which serves as a support for the other elements of the device. Near one end of the body portion is shown a circumferential integral flange 11, while the opposite extremity is reduced and threaded at 12 to receive a head 13. The portion of the body extending beyond the flange may be oppositely flattened at 14—14 to receive a pair of metallic spring arms 15—15, retained in place by an encircling insulating ring 16 under the inner edge of which the spring may be bent. These springs furnish a socket for indicating means, which, as illustrated, consists of an incandescent lamp 17 having its inner end projecting into a depression in the body portion. The leading-in wires of the lamp are soldered to external side plates 18—18 for coöperating with the springs, an insulating ring 19 surrounding these elements and insuring perfect contact.

That portion of the body lying between the flange 11 and head 13 provides a spool for resistance coils R by which the current flowing through the lamp and the resistance of the entire device may be regulated, and which are conductively associated with the socket springs and with connecting posts or terminals 20—20 secured to the outer end of the head. Two coils 21 and 22 are preferably employed, the relation of these being best shown in Fig. 4 of the drawing. The coil 21 is included in conductors 23—23 which unite the terminals 20 with the springs 15—15, and is of such resistance that the resistance of the device as a whole is approximately that of the apparatus through which the source of electrical energy to be tested is to supply current. The coil 22 is bridged across the conductors 23 in parallel with the lamp, and its resistance is so chosen with reference to that of the filament that when the lowest permissible voltage is applied to the terminals of the device, the lamp will receive sufficient current to glow strongly enough to be plainly visible to the average observer, while the application of the maximum difference of potential which the gage is to test will not result in injury to the filament.

The head 13 has an inner portion 24 of less diameter than the remainder, and fitting over this and the flange 11 is a protecting sleeve or casing 25, conveniently of metal, which may be secured in place by screws 26 taking the head. The casing has a continuation furnished by a cap 27, of hard rubber or the like, which is closed at its outer end to cover the lamp, while a reduced portion 28 enters the sleeve and is secured thereto by screws 29. The cap is provided with a contracted opening, which, as illustrated, is in the form of a transverse slot 30 inclined from the outside of the cap toward its closed end and extending adjacent to the plane of the filament. This permits the illumination of said filament to be observed, yet hoods the lamp so that outside light is largely cut off; at the same time the bulb is effectually protected against breakage. The cap 27 may be easily removed from the casing to allow the withdrawal and replacement of the lamp. The terminal posts are adapted to receive the tips 31 of flexible insulated conductors 32—32, at the opposite ends of which are spring clips 33 by which the device may be attached to the apparatus to be tested.

This instrument is especially useful in securing an indication of the condition of the limited number of cells of battery employed in connection with telephone transmitters. The lamp and coil resistance being properly proportioned for the desired purpose and the device joined to the battery or its leads by the clips, upon observing the lamp through the slot while shielded from extraneous light, it will be brightly illuminated if the cells are in good condition, but if the light is much fainter though still plainly visible the battery while becoming exhausted is yet capable of further service. If the lamp does not glow or its light is barely seen the voltage of the cells has so fallen off that they need to be renewed. Obviously, this is but one of many possible applications of my invention, which may be effectively employed whenever a highly portable and easily read instrument of no great accuracy or range is required.

I claim as my invention and desire to secure by Letters Patent:

1. An electrical testing device comprising a body portion, indicating means mounted upon one end of said body portion, a resistance coil surrounding the body portion and being in circuit with the indicating means, and a casing extending over the resistance coil and having a separable cap inclosing the indicating means and being provided with a contracted opening.

2. The combination with an elongated insulating support provided at one extremity with a socket adapted to receive an incandescent lamp and at the opposite extremity with connecting terminals, of a regulating coil surrounding the support between the socket and terminals and being connected therewith, and a casing carried by the support and inclosing the socket and coil but having an observation opening adjacent to said socket.

3. A testing device for telephone transmitter batteries, comprising an incandescent lamp, a resistance in parallel with the lamp whereby the amount of current through said lamp is controlled, and a resistance connected in series with the lamp and rendering the total resistance of the device approximately that of a transmitter.

In testimony whereof I have signed my name to this specification in the presence of two subscribing witnesses, this twelfth day of June, 1907.

CAMERON DE WITT JARVIS.

Witnesses:
GEO. WILLIS PIERCE,
JOSEPH A. GATELY.